(12) United States Patent
Nakagawa

(10) Patent No.: US 11,500,919 B2
(45) Date of Patent: Nov. 15, 2022

(54) SYSTEMS AND METHODS FOR IMAGE-BASED ONLINE MARKETPLACE POSTING

(71) Applicant: MERCARI, INC., Tokyo (JP)

(72) Inventor: Hirofumi Nakagawa, Tokyo (JP)

(73) Assignee: MERCARI, INC., Tokyo (JP)

( * ) Notice: Subject to any disclaimer, the term of this patent is extended or adjusted under 35 U.S.C. 154(b) by 221 days.

(21) Appl. No.: 16/702,355

(22) Filed: Dec. 3, 2019

(65) Prior Publication Data
US 2021/0165819 A1 Jun. 3, 2021

(51) Int. Cl.
| | |
|---|---|
| *G06F 16/535* | (2019.01) |
| *G06F 16/56* | (2019.01) |
| *G06F 16/58* | (2019.01) |
| *G06F 16/51* | (2019.01) |
| *G06F 16/53* | (2019.01) |
| G06F 16/835 | (2019.01) |
| G06F 16/735 | (2019.01) |

(52) U.S. Cl.
CPC ............ *G06F 16/535* (2019.01); *G06F 16/51* (2019.01); *G06F 16/53* (2019.01); *G06F 16/56* (2019.01); *G06F 16/5866* (2019.01); G06F 16/735 (2019.01); G06F 16/835 (2019.01)

(58) Field of Classification Search
CPC .... G06F 16/535; G06F 16/51; G06F 16/5866; G06F 16/56; G06F 16/53; G06F 16/735; G06F 16/835

USPC ................................................. 707/715, 754
See application file for complete search history.

(56) References Cited

U.S. PATENT DOCUMENTS

| | | | | |
|---|---|---|---|---|
| 2009/0164946 | A1* | 6/2009 | Liddington | G06F 16/54 715/853 |
| 2012/0269436 | A1* | 10/2012 | Mensink | G06K 9/00624 382/180 |
| 2016/0062845 | A1* | 3/2016 | Mo | G06F 16/5866 707/769 |
| 2017/0243230 | A1* | 8/2017 | Ross | G06F 16/5866 |
| 2017/0255693 | A1* | 9/2017 | Trifunovic | G06F 16/5866 707/769 |
| 2018/0012110 | A1* | 1/2018 | Soughe | G06F 16/58 |
| 2021/0224313 | A1* | 7/2021 | Liu | G06F 16/583 |

* cited by examiner

*Primary Examiner* — Shahid A Alam
(74) *Attorney, Agent, or Firm* — Morgan, Lewis & Bockius LLP

(57) ABSTRACT

Technologies generally described herein relate to a computing device for an input assistance scheme for an online marketplace posting. In one aspect, a computing device receives an input image containing an object to be posted on an online marketplace. In response to receiving the object, the computing device extracts, from the input image, feature data relating to the object. The device performs a search of an image database based on the extracted feature data to determine one or more images containing the object. The computing device obtains information data of the determined images and generates a reference dataset for the object based on the reference dataset.

19 Claims, 12 Drawing Sheets

FIG. 6A

| Image | Feature data | Item_id |
|---|---|---|
| Image 1 | FV₁ | Item_1 |
| Image 2 | FV₂ | Item_2 |
| Image 3 | FV₃ | Item_3 |
| ... | ... | ... |

SYSTEMS AND METHODS FOR IMAGE-BASED ONLINE MARKETPLACE POSTING

BACKGROUND

Unless otherwise indicated herein, the approaches described in this section are not prior art to the claims in this application and are not admitted to be prior art by inclusion in this section.

Commercial transactions through a network, so called e-commerce, have been increased over recent years, and their market is expected to be increased more and to gradually substitute for a conventional offline market in the future. In order to advertise or sell any item online, one or more images and text specification for the item are typically posted on an online marketplace. The specification for the item may include, for example, a brand name, an item name and other details of the item. Since there are various kinds of products and each product has different specification, it is time-consuming and tiresome for users to specify the item to be posted and describe the specification with text, and there could be errors in the users' descriptions.

SUMMARY

Technologies generally described herein relate to an input assistance scheme.

Various example methods using one or more computing devices are described. Example methods may include obtaining, using one or more computing devices, an input image containing an object; conducting, using the one or more computing devices, a search of an image database based, at least in part, on the input image to search for one or more images containing the object; obtaining, using the one or more computing devices, information data of the one or more searched images from the image database; and generating, using the one or more computing devices, a reference dataset for the object based, at least in part, on the information data, the reference dataset including at least some of the information data. In some examples, the conducting of the search includes extracting, from the input image, feature data relating to the object; and determining the one or more images based, at least in part, on the extracted feature data relating to the object. In some examples, the methods may further comprise providing, using the one or more computing devices, a suggested text relating to the object based, at least in part, on the reference dataset. In some examples, the methods may further comprise receiving, using the one or more computing devices, a user input relating to the object; and providing, using the one or more computing devices, at least one candidate text relating to the user input based, at least in part, on the reference dataset.

In some examples, computing devices for providing input assistance are described. Example computing devices may include at least one processor; and at least one memory. The at least one memory may store instructions. The at least one processor executes the instructions to perform operations. The operations may comprise obtaining an input image containing an object; transmitting the input image to a server; receiving, from the server, information data of one or more searched images containing the object; and generating a reference dataset for the object based, at least in part, on the information data, wherein the reference dataset includes at least some of the information data. In some examples, the operations may further comprise providing a suggested text relating to the object based, at least in part, on the reference dataset. In some examples, the operations may further comprise receiving a user input relating to the object; and providing at least one candidate text relating to the user input based, at least in part, on the reference dataset.

In some examples, a non-transitory computer-readable storage medium is described. The example non-transitory computer-readable storage medium may store instructions executable by a computing device to cause the computing device to perform operations. The operations may include obtaining an input image containing an object; obtaining information data of one or more images containing the object, the one or more images being searched from an image database based on the input image; and generating a reference dataset for the object based, at least in part, on the information data, wherein the reference dataset includes at least some of the information data. In some examples, the generating of the reference dataset includes constructing at least one tree data structure for the at least some of the information data. In some examples, the operations may further comprise providing a suggested text relating to the object based, at least in part, on the reference dataset. In some examples, the operations may further comprise receiving a user input relating to the object; and providing at least one candidate text relating to the user input based, at least in part, on the reference dataset.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 6A shows a portion of an image database and FIG. 6B shows another portion of the image database, arranged in accordance with at least some embodiments described herein;

DETAILED DESCRIPTION

Figure 1:
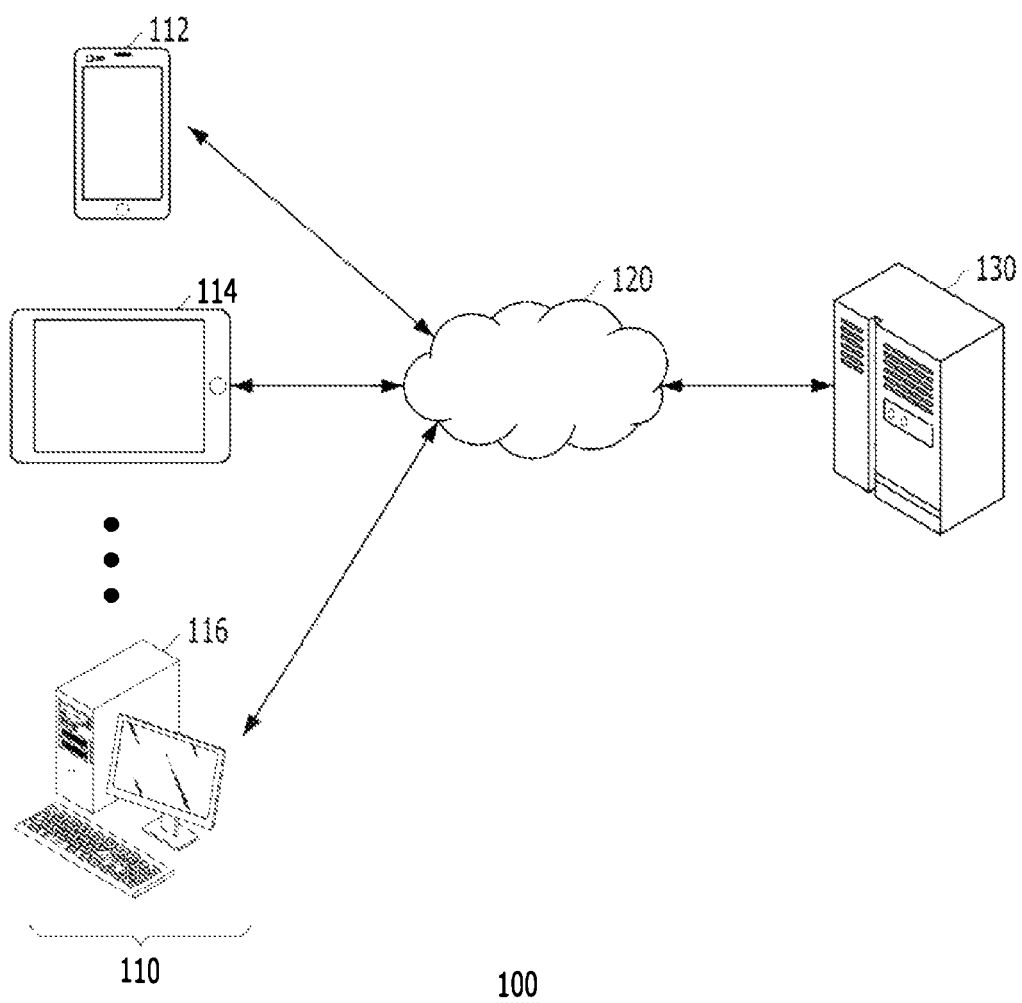
FIG. 1 shows a diagram of an example input assistance system where a user device is configured to communicate with a server via a network, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the figures, can be arranged, substituted, combined, separated, and designed in a wide variety of different configurations, all of which are explicitly contemplated herein.

This disclosure is generally drawn, inter alia, to methods, systems, devices and computer-readable storage media related to input assistance.

Briefly stated, technologies are generally described for providing text input assistance based on an image search. In various examples, a user may want to post an object, such as his/her possession, on an online marketplace with a text describing the object by using a user device. The text describing the object may include for example, a category, a brand name and/or some details of the object. The user may choose an input image containing the object using the user device. The input image may be captured by a camera associated with the user device, read from a memory of the user device, or retrieved through a network, such as the Internet. The user device may transmit the input image to a server. The server may conduct an image search of an image database and determine one or more images containing the object as a result of the image search. In some examples, in conducting the image search, the server may extract, from the obtained input image, feature data relating to the object and determine the one or more images based on the extracted feature data. The server may determine information data of the one or more searched images from the image database. The server may transmit the determined information data to the user device. Then, the user device may receive the information data and generate a reference dataset for the object based on the information data.

The user device may provide a suggested text relating to the object with reference to the reference dataset. The suggested text may be automatically determined and displayed on the user device. Meanwhile, the user may make, using an input means associated with the user device, a user input, such as a text input. Then, the user device may display at least one candidate text relating to the user input with reference to the reference dataset. Thereafter, the user may select one of the at least one candidate text, and the selected one is posted as one of details of the object.

Although the feature data is described to be extracted by the server in the above, it may also be possible that the user device extracts the feature data from the input image and transmits the extracted feature data to the server, depending on desired configurations. Further, although the reference dataset is described to be generated by the user device in the above, it may also be possible that the server generates the reference dataset and transmits it to the user device, depending on desired configurations.

FIG. 1 shows a diagram of an example input assistance system where a user device is configured to communicate with a server via a network, arranged in accordance with at least some embodiments described herein. As depicted, an input assistance system 100 may include a user device 110, a network 120 and a server 130. User device 110 may be any type of computing device, such as a user device 112, 114, . . . or 116, that is configured to run, execute, or operate an application program including instructions in accordance with the present disclosure and configured to display an input image and a suggested text or at least one candidate text.

User device 110 may download the application program according to the present disclosure via network 120 from server 130 and/or other external devices (not shown), for example, an application providing server, such as Play Store®, App Store®, etc. Various types of user device 110 may include, but are not limited to, a desktop computer, a mobile computer (e.g., a laptop, a ultra-book, a netbook), a mobile phone (including a smart phone), a tablet computer and/or a personal digital assistant (PDA).

User device 110 may access server 130 via network 120. Network 120 may be any wired network, wireless network, or combination thereof. In addition, network 120 may include, but not limited to, a personal area network, a local area network, a wide area network, an over-the-air broadcast network (e.g., for radio or television), a cable network, a satellite network, a cellular telephone network, or combination thereof. For example, network 120 may be a publicly accessible network of linked network, possibly operated by various distinct parties, such as the Internet. In some embodiments, network 120 may be a private or semi-private network, such as a corporate or university intranet. Network 120 may include one or more wireless networks, such as a Code Division Multiple Access (CDMA) network, a Long Term Evolution (LTE) network, a Long Term Evolution-Advanced (LTE-A) network, Interoperability for Microwave Access (WiMax) network, Wireless Fidelity (Wi-Fi) network and any other type of wireless network. For example, the protocols used by network 120 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Server 130 may be implemented as a single computing device, a server farm comprising multiple servers, a distributed network, a cloud-computing configuration, and/or the like. Server 130 may comprise one or more processors and a memory.

In some embodiments, user device 110 may be configured to obtain an input image. In some examples, user device 110 may capture the input image by a camera associated with user device 110. In some other examples, user device 110 may read the input image from a local memory of user device 110. Otherwise, user device 110 may retrieve the input image through network 120 (e.g., the Internet). The input image may include an object, for example, to be posted or advertised. User device 110 may display the input image on a display screen associated with user device 110 such that the user can confirm the input image.

In some embodiments, user device 110 may be configured to transmit the input image to server 130 via network 120. Server 130 may be configured to receive the input image. Server 130 may be configured to conduct a search of an image database based on the input image. Server 130 may search for a plurality of images stored in the image database based on similarities between the input image and the stored images. Server 130 may also search for one or more images containing the object. The image database may be included in server 130 and/or in other computing devices communicatively connected to server 130.

In some examples, server 130 may be configured to extract, from the received input image, feature data relating to the object. The image database may store a plurality of images, each of which contains an item. Further, the image database may also store feature data of each stored image. The feature data may include at least one of, for example, feature vectors, graphs or images. Such feature data may also include a set of decimal fractions.

Server 130 may be configured to determine the one or more images based on the extracted feature data relating to the object. In some examples, server 130 may compare the feature data relating to the object with feature data of each of the plurality of images stored in the image database. When difference between the feature data relating to the object and the feature data of an image stored in the image database is within a predetermined value, server 130 may determine a corresponding image as one of the one or more images containing the object. In an example, when the feature data includes feature vectors, the compared difference may include distance values between the feature vectors.

Alternatively, user device 110 may be configured to extract, from the input image, feature data relating to the object and transmit the feature data to server 130. Then, server 130 may be configured to conduct a search of an image database based the received feature data to search for the one or more images.

In some embodiments, server 130 may be configured to obtain information data of the one or more searched images. For example, the information data may include at least one of a title, a category, a brand name, a detail description, etc. relating to the one or more images. In some examples, the image database may include, for example, a feature database storing identifiers of the items contained in the stored images; and an item database storing details (e.g., a title, a category, a brand name, any detail descriptions, etc.) of the items contained in the stored images. Server 130 may be configured to determine, from the feature database, one or more identifiers of the one or more images. Then, server 130 may be configured to obtain, from the item database, the information data of the one or more images based on the one or more determined identifiers.

In some embodiments, server 130 may be configured to transmit the information data to user device 110. User device 110 may be configured to receive the information data and generate a reference dataset for the object based on the information data. The reference dataset may include at least some of the information data. In some examples, user device 110 may be configured to construct at least one tree data structure for the at least some of the information data. In constructing the at least one tree data structure, user device 110 may perform morphological analysis for the text in the information data. To perform the morphological analysis, various well-known analyzers, including by way of example but not limited to ChaSen, Rosette Base Linguistics, IBM Watson Explorer, etc. can be used. Further, user device 110 may construct at least one tree data structure using the analyzed data. The tree data structure may include a trie-tree data structure. That is, the tree data structure may include multiple nodes. A position of a node in the tree structure defines keys that are usually strings. All the descendants of the node have a common prefix of the string associated with that node. Further, the tree data structure may include a tree diagram with each node indicating their probability.

Additionally, user device 110 may be configured to filter the information data based on a predetermined list. The predetermined list may include specific words for the object, for example, that may not be suitable to describe the object objectively. For example, such specific words may include " . . . % discount off," "only for . . . " (which describes the range of users), "limited to . . . " (which limits the condition of sales), etc. Alternatively, server 130 may be configured to filter the information data based on the predetermined list, and transmit the filtered information data to user device 110. User device 110 or server 130 may generate the reference dataset based on the filtered information data.

Alternatively, server 130 may be configured to generate a reference dataset for the object based on the information data and transmit the generated reference dataset to user device 110. Then, user device 110 may receive the reference dataset to use for input assistance.

In some embodiments, user device 110 may be configured to provide a suggested text relating to the object based on the reference dataset. In an example, user device 110 may determine one of the searched images that is the most similar to the input image, select a text corresponding to the determined image from the reference dataset and determine the selected text as the suggested text. In another example, the reference dataset may include data with its probability and user device 110 may determine a text with the highest probability from the reference dataset as the suggested text.

In some embodiments, user device 110 may be configured to receive a user input relating to the object. Before or after providing the suggested text, the user may input, using any input means associated with user device 110, a user input to describe some details of the object. Such user input may be a text input. User device 110 may be configured to provide at least one candidate text based on the user input with reference to the reference dataset. In some examples, while the user input is being received, user device 110 may refer to the reference dataset to determine at least one candidate text that is related to the user input. User device 110 may display the at least one candidate text, and when the user selects one of the at least one candidate text, user device 110 may complete the user input according to the selected text.

The user usually posts (e.g., upload) image(s) relating to the object and its text details using user device 110, for example, for an online sale. As described with reference to FIG. 1, user device 110 can provide text input assistance based on the input image, and thus, improved accuracy and efficiency of the user input, i.e., the text input can be achieved.

Figure 2:
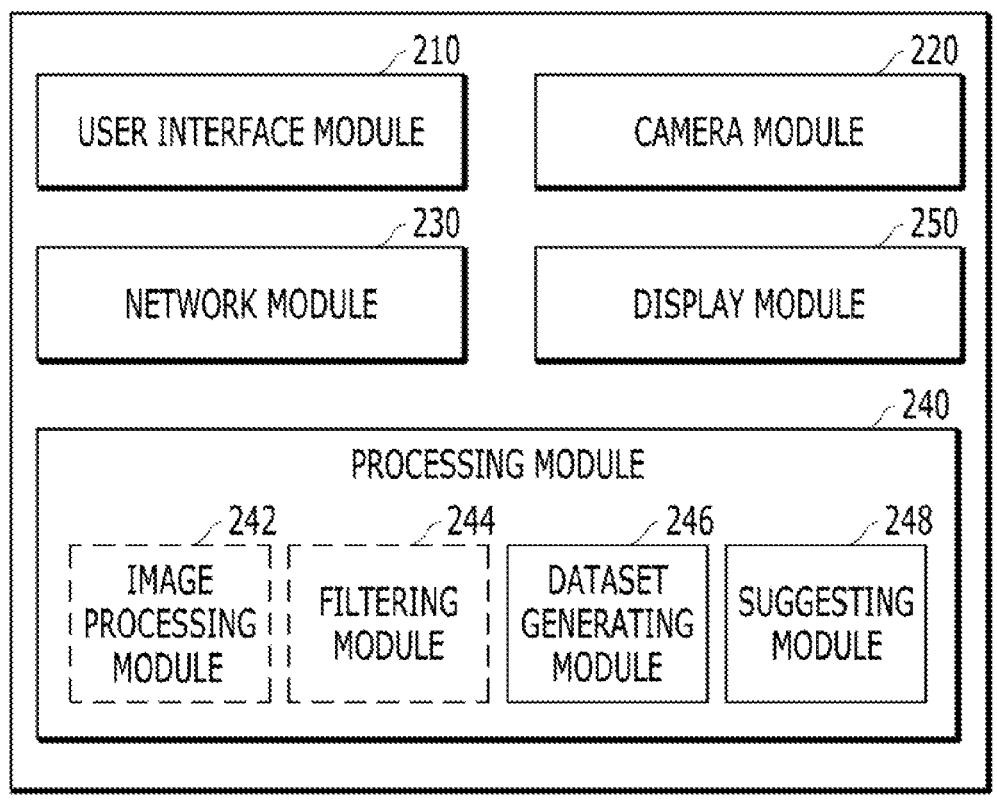
FIG. 2 shows a block diagram of an example user device, arranged in accordance with at least some embodiments described herein.

FIG. 2 shows a block diagram of an example user device, arranged in accordance with at least some embodiments described herein. As illustrated, a user device may include a user interface module 210, a camera module 220, a network module 230, a processing module 240 and a display module 250. Additionally or optionally, processing module 240 may include an image processing module 242 and/or a filtering module 244. Further, processing module 240 may include a dataset generating module 246 and/or a suggesting module 248. In some embodiments, user device 200 may be any suitable type of computing devices configured to run, execute, or operate an application program including instructions in accordance with the present disclosure. The configuration of user device 200 as illustrated in FIG. 2 may be an example of user device 112, 114, . . . , or 116 as illustrated in FIG. 1.

In some embodiments, user interface module 210 may be configured to receive a user input for an input image containing an object and obtain the input image. In an example, camera module 220 may capture the input image using a camera device of user device 200 and user interface module 210 may receive a user input to determine the captured image as the input image. In another example, user interface module 210 may read the input image from a local memory (not shown) of user device 200. In yet another example, user interface module 210 may retrieve the input image through a network (e.g., the Internet). Display module 250 may be configured to present the input image on at least one display screen operatively connected with user device 200.

In some embodiments, network module 230 may be configured to transmit the input image to a server. The server may conduct an image search of an image database to search for one or more images containing the object. Then, in response to transmitting of the input image, network module 230 may be configured to receive information data of one or more searched images containing the object. For example, the information data may include at least one of a title, a category, a brand name, a detail description, etc. relating to the one or more images (i.e., objects contained in the one or more images).

Alternatively and optionally, image processing module 242 of processing module 240 may be configured to extract, from the input image, feature data relating to the object. The feature data may include at least one of, for example, feature vectors, graphs or images. Such feature data may also include a set of decimal fractions. Network module 230 may transmit, instead of the input image, the feature data relating to the object to the server, and in response to transmitting of the feature data, network module 230 may receive information data of the one or more searched images.

Additionally or optionally, filtering module 244 may be configured to filter the received information data based on a predetermined list. The predetermined list may include specific words for the object. The specific words may be predetermined by the user, received from the server or preset in the application program according to the present disclosure. For example, such specific words may include " . . . % discount off," "only for . . . " (which describes the range of users), "limited to . . . " (which limits the condition of sales), etc.

In some embodiments, dataset generating module 246 of processing module 240 may be configured to generate a reference dataset for the object contained in the input image based on the information data. The reference dataset may include at least some of the information data. In some examples, dataset generating module 246 may be configured to construct at least one tree data structure for the at least some of the information data. Dataset generating module 246 may perform morphological analysis for the text in the information data. Various analyzers including, by way of example but not limited to, ChaSen, Rosette Base Linguistics, IBM Watson Explorer, etc. can be used. Further, dataset generating module 246 may construct at least one tree data structure using the analyzed data. The tree data structure may include a trie-tree data structure including multiple nodes for a text search. A position of a node in the tree structure defines keys that may be usually strings. All the descendants of the node have a common prefix of the string associated with that node. Further, the tree data structure may include a tree diagram with each node indicating their probability. The probability may be related to the details of the object contained in the input image and obtained from the information data. In some further examples, dataset generating module 246 may generate the reference dataset based on the filtered information data filtered by filtering module 244.

Alternatively, network module 230 may receive the generated reference dataset from the server to use for input assistance. In such case, the server may have generated the reference dataset for the object based on the information data.

In some embodiments, suggesting module 248 may be configured to provide at least one suggested text relating to the object with reference to the reference dataset. In an example, suggesting module 248 may determine one of the searched images that is the most similar to the input image. The most similar image may be indicated in the reference dataset. In such example, suggesting module 248 may select a text corresponding to the determined image from the reference dataset and determine the selected text as the suggested text. In another example, the reference dataset may include data with its probability and suggesting module 248 may determine a text with the highest probability from the reference dataset as the suggested text.

In some embodiments, user interface module 210 may be configured to receive a user input for describing the object. While user interface module 210 receives the user input to describe some details of the object before or after display module 250 displays the suggested text, suggesting module 248 may be configured to provide at least one candidate text based, at least in part, on the reference dataset. Such user input may be a text input. The at least one candidate text is related to the user input received through user interface module 210. In some examples, while the user input is being received, suggesting module 248 may refer to the reference dataset to determine at least one candidate text. Display module 250 may display the at least candidate text and, when the user selects one of the at least one candidate text, user interface module 210 may complete the user input according to the selected text.

Figure 3:
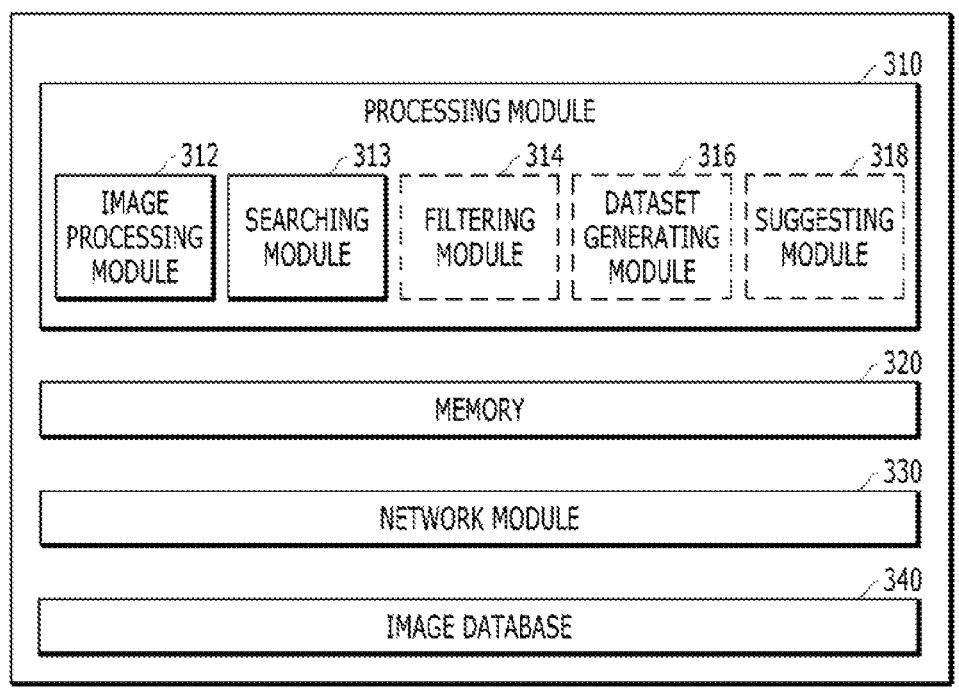
FIG. 3 shows a block diagram of an example server, arranged in accordance with at least some embodiments described herein.

FIG. 3 shows a block diagram of an example server, arranged in accordance with at least some embodiments described herein. As illustrated, a server 300 may include a processing module 310, a memory 320, a network module 330 and an image database 340 operatively coupled to each other or otherwise in communication with each other. Server 300 may be implemented as a single computing device, a server farm comprising multiple servers, a distributed network, a cloud-computing configuration, and/or the like.

Depending on desired configurations, processing module 310 may include one or more processors and memory 320 may include one or more memories. Processing module 310 may be configured to execute instructions stored in memory 320 to perform operations in accordance with the present disclosure and memory 320 may be configured to store the instructions for conducting an image search and obtaining the information data of the searched images. Optionally, memory 320 may be further configured to store the instructions for generating a reference dataset from the information dataset. Processing module 310 may include an image processing module 312 and a searching module 313. Additionally or optionally, processing module 310 may include a filtering module 314, a dataset generating module 316 and/or a suggesting module 318.

In some embodiments, network module 330 may be configured to exchange data with a user device (such as, for example, user device 110 in FIG. 1 or user device 200 in FIG. 2) via a network (such as, for example, network 120 in FIG. 1). The user may choose an input image by using the user device and the user device may transmit information regarding the input image to a server 300. In some examples, network module 330 may receive the input image from the user device. In some other examples where the input image is located in another server, network module 330 may retrieve the input image from the other server through the network.

Processing module 310 may be configured to conduct a search of image database 340 to search for one or more images stored in image database 340 based on the input image. The searched one or more images may contain the object. In some examples, image processing module 312 may be configured to extract, from the received input image, feature data relating to the object. Alternatively, network module 330 may receive, from the user device, feature data relating to the input image. The feature data may include at least one of, for example, feature vectors, graphs or images. Such feature data may also include a set of decimal fractions. In such examples, image database 340 may not only store a plurality of images, each of which contains an item, but also feature data of the item contained in each stored image.

Searching module 313 may determine one or more images based on the extracted feature data relating to the object contained in the input image. In some examples, searching module 313 may compare the extracted feature data with feature data of each of the plurality of images stored in image database 340. When difference between the feature data relating to the object and the feature data of an image stored in the image database is within a predetermined value, searching module 313 may determine the corresponding image as one of the one or more images containing the object. In an example, when the feature data includes feature vectors, the compared difference may include distance values between the feature vectors.

In some embodiments, searching module 313 may be configured to obtain information data of the one or more searched images. For example, the information data may include at least one of a title, a category, a brand name, a detail description, etc. relating to the one or more images. In some examples, searching module 313 may obtain the information data from image database 340. In such examples, image database 340 may include, for example, a feature database and an item database. The feature database may store an identifier of each item contained in each image stored in image database 340 and correspond each of the identifiers to each stored image. The item database may store details of each item (e.g., a title, a category, a brand name, any detail descriptions, etc.) and correspond each identifier to stored details of the each item. Searching module 313 may determine, from the feature database, one or more identifiers of the one or more searched images, and then obtain, from the item database, the information data of the one or more searched images. The information data may include the details corresponding to determined identifiers.

Additionally, filtering module 314 may be configured to filter the information data based on a predetermined list. Memory 320 may store the predetermined list including specific words for the object. For example, such specific words may include words considered not suitable to describe the object objectively, such as " . . . % discount off," "only for . . . " (which describes the range of users), "limited to . . . " (which limits the condition of sales), etc.

Optionally, dataset generating module 316 may be configured to generate a reference dataset for the object based on the information data. The reference dataset may include at least some of the information data. In some examples, dataset generating module 316 may be configured to construct at least one tree data structure for the at least some of the information data. Dataset generating module 316 may perform morphological analysis for the text in the information data. To perform the morphological analysis, various well-known analyzers including, by way of example but not limited to, ChaSen, Rosette Base Linguistics, IBM Watson Explorer, etc. can be used. Further, dataset generating module 316 may construct at least one tree data structure using the analyzed data. The tree data structure may include a trie-tree data structure. Further, the tree data structure may include a tree diagram with each node of the tree structure indicating their probability. Dataset generating module 316 may generate the above described reference dataset based on the filtered information data. In some other embodiments, network module 330 may be configured to transmit the information data to the user device such that the user device can generate the reference dataset.

Optionally or additionally, suggesting module 318 may be configured to provide at least one suggested text relating to the object with reference to the reference dataset. In an example, suggesting module 318 may determine one of the searched images that is the most similar to the input image. The most similar image may be indicated in the reference dataset. In such example, suggesting module 318 may select a text corresponding to the determined image from the reference dataset and determine the selected text as the suggested text. In another example, the reference dataset may include data with its probability and suggesting module 318 may determine a text with the highest probability from the reference dataset as the suggested text. In some embodiments, network module 330 receives a user input for describing the object, and suggesting module 318 may be configured to provide at least one candidate text based, at least in part, on the reference dataset. Such user input may be a text input. The at least one candidate text is related to the received user input. In some examples, while network module 330 receives the user input, suggesting module 318 may refer to the reference dataset to determine at least one candidate text. Network module 330 may transmit the provided suggested text and candidate text to user device.

Figure 4:
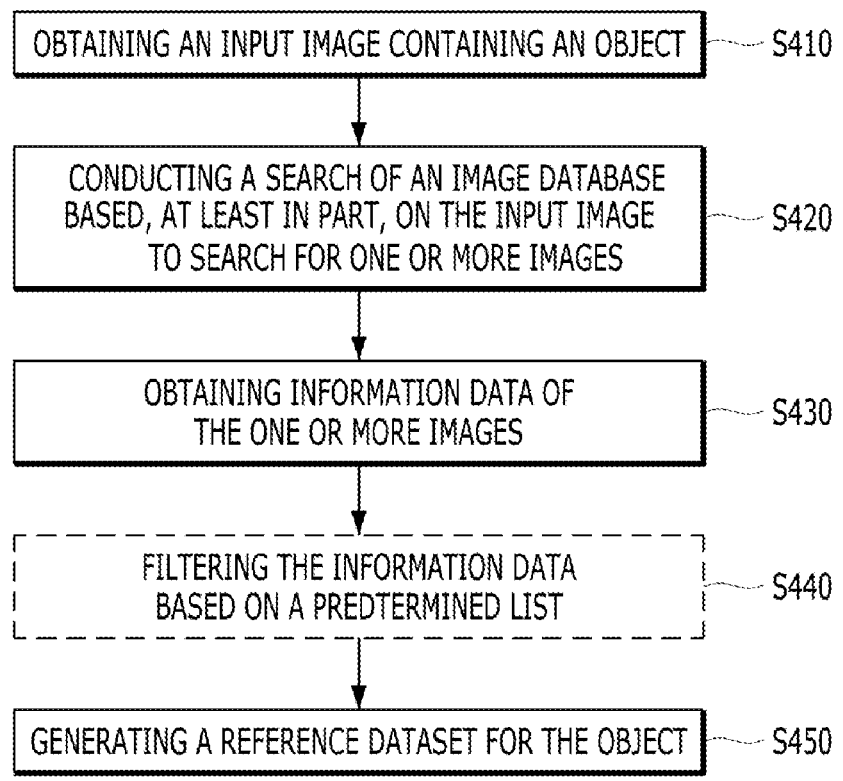
FIG. 4 illustrates an example flow diagram of a process for providing input assistance, arranged in accordance with at least some embodiments described herein.

FIG. 4 illustrates an example flow diagram of a process for providing input assistance, arranged in accordance with at least some embodiments described herein. A process 400 of FIG. 4 may be implemented using one or more computing devices, such as, for example, user device 110 or 200 described with reference to FIGS. 1 and 2 and/or server 130 or 300 described with reference to FIGS. 1 and 3. Process 400 may include one or more operations, actions, or functions as illustrated by one or more of blocks S410, S420, S430 and/or S450. Process 400 may further include one or more operations, actions, or functions as illustrated by block S440. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. Process 400 may begin at block S410, "OBTAINING AN INPUT IMAGE CONTAINING AN OBJECT."

At block S410, the one or more computing devices may obtain an input image. The one or more computing devices may obtain the input image through various ways as described above. Block S410 may be followed by block S420, "CONDUCTING A SEARCH OF AN IMAGE DATABASE BASED, AT LEAST IN PART, ON THE INPUT IMAGE TO SEARCH FOR ONE OR MORE IMAGES."

At block S420, the one or more computing devices may conduct an image search of an image database based on the input image. In some examples, the one or more computing devices may extract, from the input image, feature data relating to the object. The computing devices may determine the one or more images based on the extracted feature data relating to the object. The extracted feature data may include at least one of, for example, feature vectors, graphs or images. Such feature data may also include a set of decimal fractions. In some examples, the computing device may compare the feature data with feature data of each of a plurality of images stored in the image database to determine the one or more images. When the compared difference is within a predetermined value, the computing device may determine the corresponding image stored in the image database as one of the searched images containing the object. The difference may include a distance between the feature vectors. Block S420 may be followed by block S430, "OBTAINING INFORMATION DATA OF THE ONE OR MORE IMAGES."

At block S430, the one or more computing devices may obtain information data of the one or more searched images from the image database. For example, the information data may include at least one of a title, a category, a brand name, a detail description, etc. relating to the one or more images. Additionally, Block S430 may be followed by block S440, "FILTERING THE INFORMATION DATA BASED ON A PREDETERMINED LIST."

At block S440, the one or more computing devices may filter the information data based on a predetermined list. The predetermined list may include specific words for the object, for example, that may not be considered suitable to describe the object objectively. For example, such specific words may include " . . . % discount off," "only for . . . " (which describes the range of users), "limited to . . . " (which limits the condition of sales), etc. Block S430 or S440 may be followed by block S450, "GENERATING A REFERENCE DATASET FOR THE OBJECT."

At block S450, the one or more computing devices may generate a reference dataset for the object based, at least in part, on the information data. In some examples where block S440 is carried out, the computing device may generate the reference dataset based on the filtered information data. In some examples, the reference dataset may include at least one item name data for suggesting an item name of the object and at least one detailed description data for suggesting a detailed description of the object. In some examples, the computing devices may construct at least one tree data structure for the at least some of the information data. The tree data structure may include a trie-tree data structure including multiple nodes hierarchically connected. Further, the tree data structure may include a tree diagram with each node indicating their probability.

Figure 5:
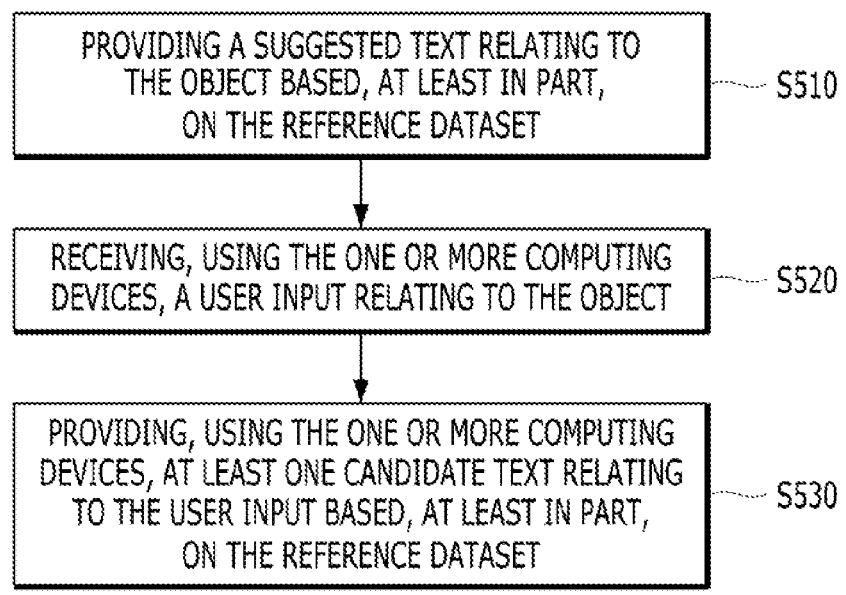
FIG. 5 illustrates an example flow diagram of a further process for providing input assistance, arranged in accordance with at least some embodiments described herein.

FIG. 5 illustrates an example flow diagram of a further process for providing input assistance, arranged in accordance with at least some embodiments described herein. A process 500 of FIG. 5 may be implemented using one or more computing devices, for example, user device 110 or 200 described with reference to FIGS. 1 and 2. Process 500 may be carried out after process 400 as illustrated in FIG. 4.

Process 500 may include one or more operations, actions, or functions as illustrated by one or more of blocks S510, S520 and/or S530. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. For example, blocks S520 and S530 can be perform with omitting block S510. Process 500 may begin at block S510, "PROVIDING A SUGGESTED TEXT RELATING TO THE OBJECT BASED, AT LEAST IN PART, ON THE REFERENCE DATASET."

At block S510, the one or more computing devices may provide a suggested text relating to the object based, at least in part, on the reference dataset. For example, the reference dataset is generated as illustrated in FIG. 4. In an example, the computing devices may select, using the reference dataset, a text corresponding to the most similar image to the input image. In another example that the reference dataset include data with its probability, the computing devices may determine a text with the highest probability from the reference dataset as the suggested text. Block S510 may be followed by block S520, "RECEIVING, USING THE ONE OR MORE COMPUTING DEVICES, A USER INPUT RELATING TO THE OBJECT."

At block S520, the one or more computing devices may receive a user input relating to the object. The user input may be descriptions of details, such as an item name of the object, a brand name of the object, etc. Such user input may be a text input. Block S520 may be followed by block S530, "PROVIDING, USING THE ONE OR MORE COMPUTING DEVICES, AT LEAST ONE CANDIDATE TEXT RELATING TO THE USER INPUT BASED, AT LEAST IN PART, ON THE REFERENCE DATASET."

At block S530, the one or more computing devices may provide at least one candidate text based, at least in part, on the reference dataset. The at least one candidate text is related to the user input. In some examples, while the user input is being received, the computing devices may refer to the reference dataset to determine at least one candidate text. The computing devices may display the at least candidate text and, when the user selects one of the at least one candidate text, the computing devices may complete the user input according to the selected text.

Figure 6A:
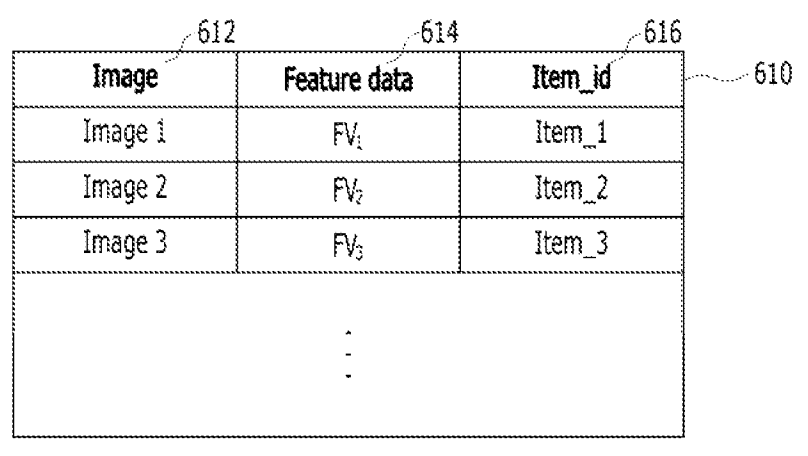
Figure 6B:
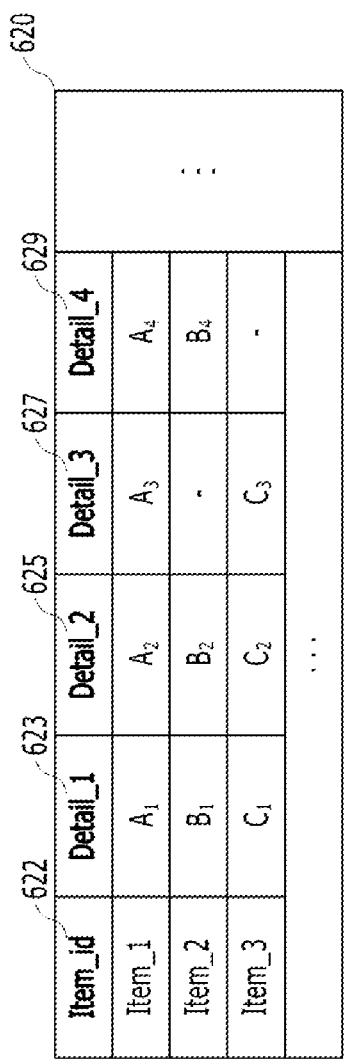

FIG. 6A shows a portion of an image database and FIG. 6B shows another portion of the image database, arranged in accordance with at least some embodiments described herein. The image database according to the present disclosure may include for example, a feature database 610 as illustrated in FIG. 6A and an item database 620 as illustrated in FIG. 6B.

As depicted in FIG. 6A, feature database 610 may include three columns of data, for example, an image column 612, a feature data column 614 and identifier column 616. Image column 612 may include image data or define a locator of each image data. Feature data column 614 may include feature data, such as feature vectors. Identifier column 616 may include data of an item identifier corresponding to the item contained in the image. In an example, a computing device according to the present disclosure may compare feature data extracted from an input image with the feature data in feature data column 614. Then, the computing device may determine Image 1, Image 2 and Image 3 as an image search result and determine Item_1, Item_2 and Item_3 to obtain information data.

As depicted in FIG. 6B, item database 620 may include two or more columns of data. The columns of item database 620 may include an identifier column 622 and one or more detail columns 623, 625, 627, 629, etc. Identifier column 622 may include data of item identifier corresponding to those in identifier column 616. Each of one or more detail columns 623, 625, 627, 629 may or may not include detail data for each item. Each data of one or more detail columns 623, 625, 627, 629 may be related to, for example, a category, a brand name, any detail descriptions, etc. In an example where the computing device determines item identifiers of Item_1, Item_2 and Item_3 from feature database 620, the computing device may obtain the information data including $A_1$, $B_1$, $C_1$ from detail column 623, $A_2$, $B_2$, $C_2$ from detail column 625, $A_3$, $C_3$ from detail column 627 and $A_4$, $B_4$ from detail column 629.

Figure 7A:
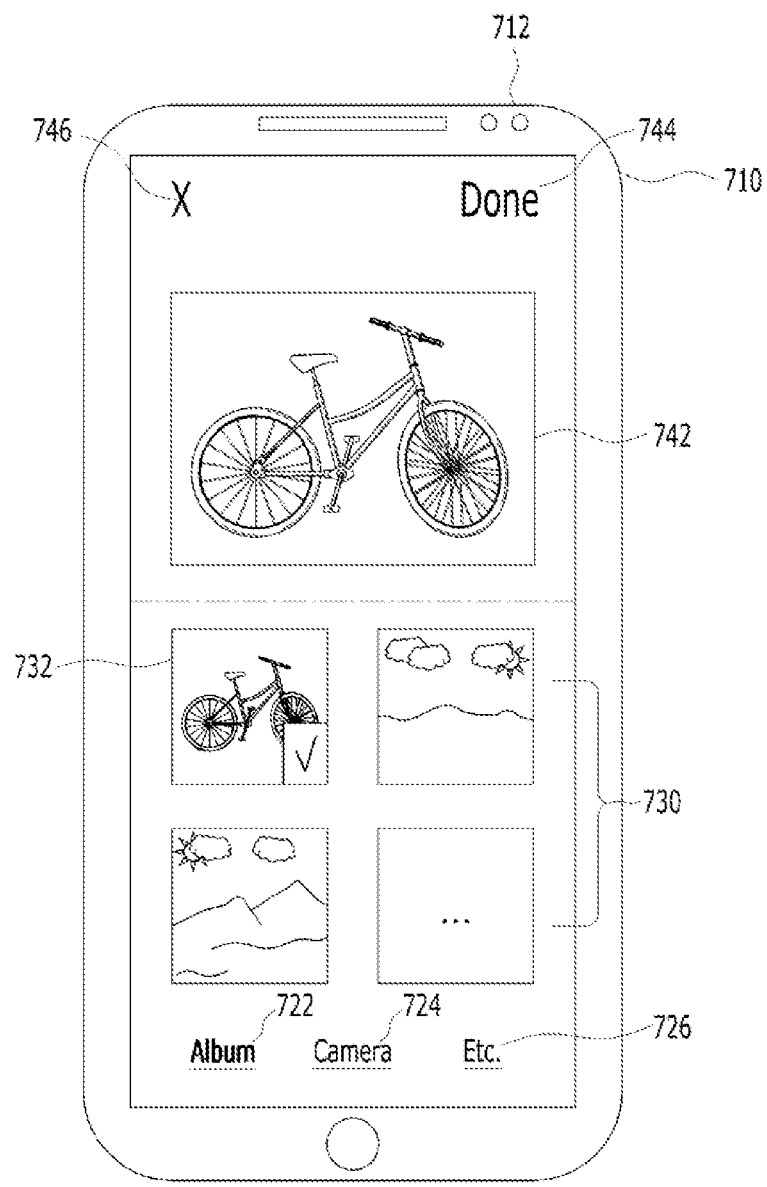
FIG. 7A shows an illustrative example of a user device configured to obtain an input image containing an object.

FIG. 7A shows an illustrative example of a user device configured to obtain an input image containing an object, arranged in accordance with at least some embodiments described herein. A user device 710 may also include a camera 712. User device 710 may include a display screen with a touch interface. User device 710 displays a user interface as shown in FIG. 7A. User device 710 displays a button 722 ("Album") to show images stored in user device 710 and allow a user to select one of the images. When the user selects an image 732 on the display screen, user device 710 may display a bigger image 742 corresponding to the selected image 732. Then, the user may push a button 744 ("Done") to decide the selected image 732 as an input image. Otherwise, the user may push a button 746 ("X") to cancel the operation by the user or quit the user interface of inputting of an image. The user may also push a button 724 ("Camera") to capture an image using camera 712 of user device 710 to obtain an input image. Further, the user may push a button 726 ("Etc.") to obtain an input image in a different way, such as using of a barcode of the object, searching of an image through a network, etc.

Figure 7B:
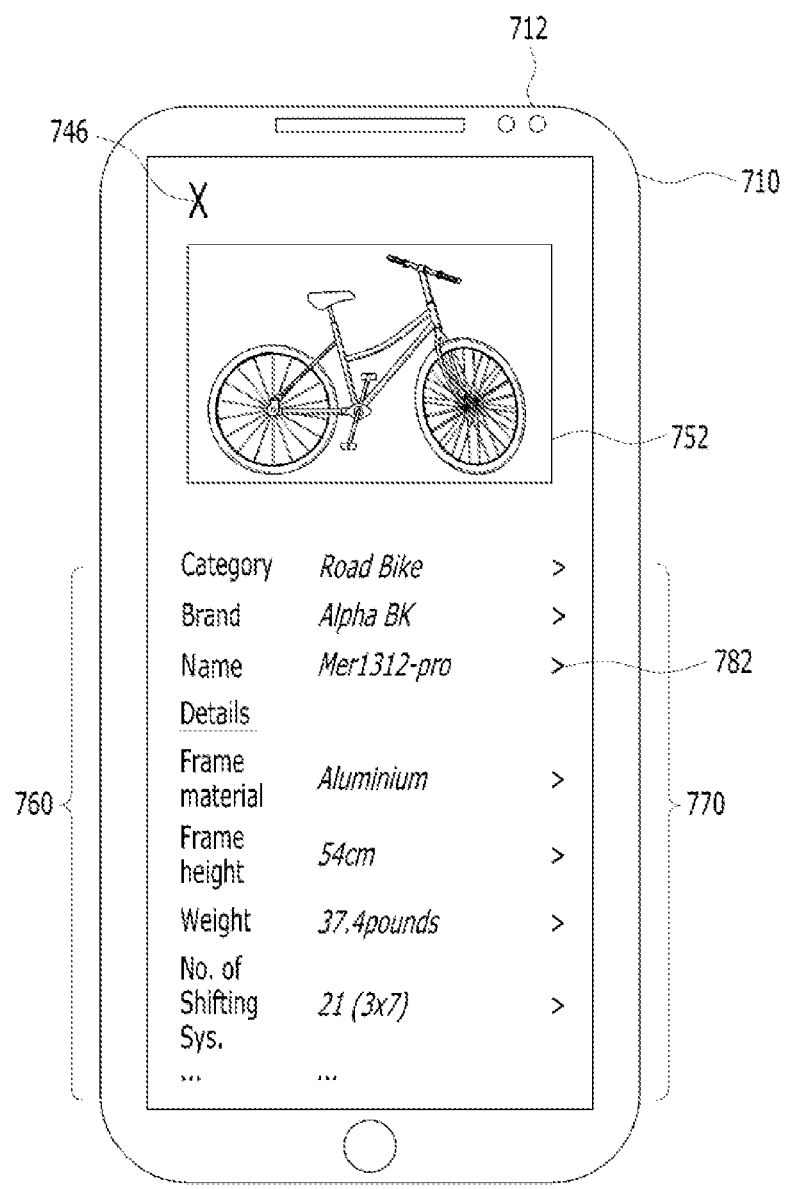
FIG. 7B shows an illustrative example of the user device configured to provide a suggested text relating to the object and FIG. 7C shows an illustrative example of the user device configured to provide at least one candidate text relating to a user input, arranged in accordance with at least some embodiments described herein.

FIG. 7B shows an illustrative example of a user device configured to provide a suggested text relating to the object, arranged in accordance with at least some embodiments described herein. After obtaining the input image as illustrated in FIG. 7A, user device 710 may obtain a reference dataset according to the present disclosure. User device 710 may also display an input image 752 on the display screen. User device 710 may provide a user interface to describe details of the object contained in input image 752. User device 710 may determine suggested texts with reference to the reference dataset and display them on the display screen. User device 710 may display a set of buttons 770 (">") to change the determined texts. For example, the user may select a button 782 among the set of buttons 770 to change an item name of the object. The user may also select a button 746 ("X") to quit the user interface of completing details of the object contained in input image 752.

Figure 7C:
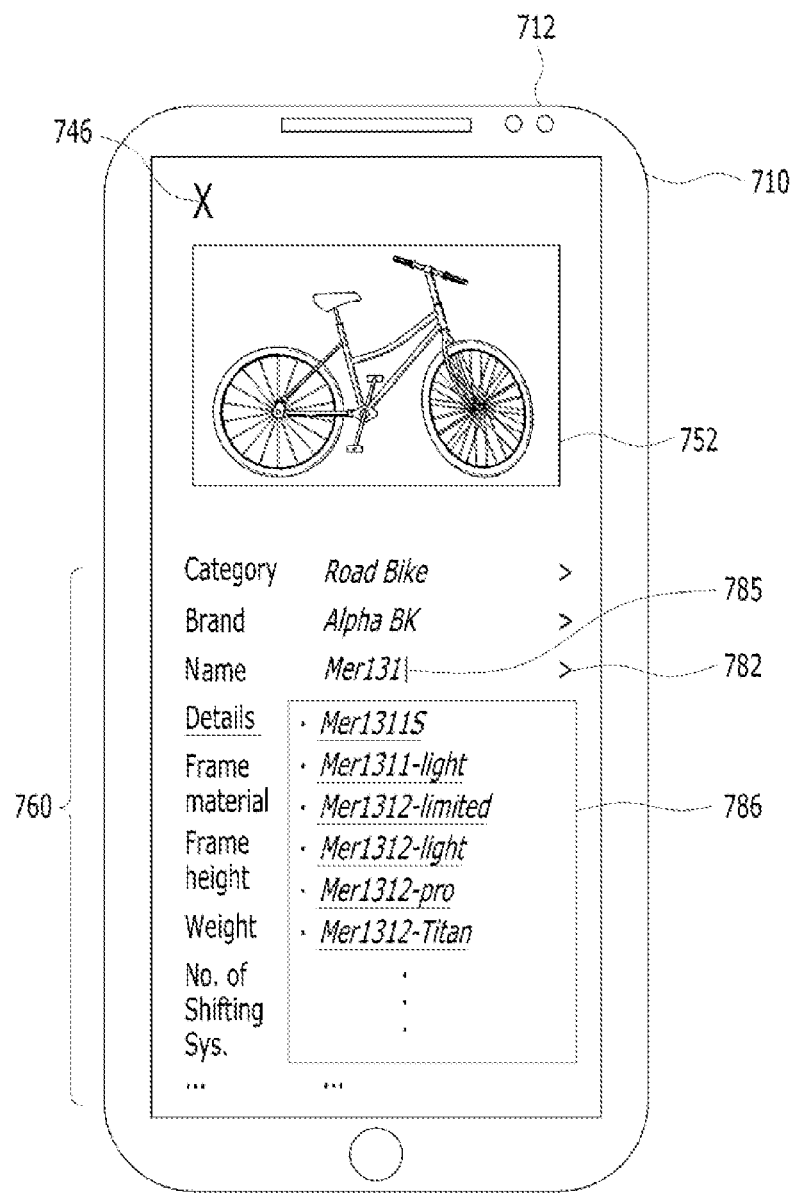

FIG. 7C shows an illustrative example of a user device configured to provide at least one candidate text relating to a user input, arranged in accordance with at least some embodiments described herein. The user may input a text input 785 ("Mer131") using any input means. Based on the received text input 785, user device 710 may refer to the reference dataset and determine multiple candidate texts 786. User device 710 may display the multiple candidate texts 786 to allow the user to select one from the displayed multiple candidate texts 786. When the user makes the selection, user device 710 may complete the user input, for example, the item name of the object according to the selected text.

Figure 8:
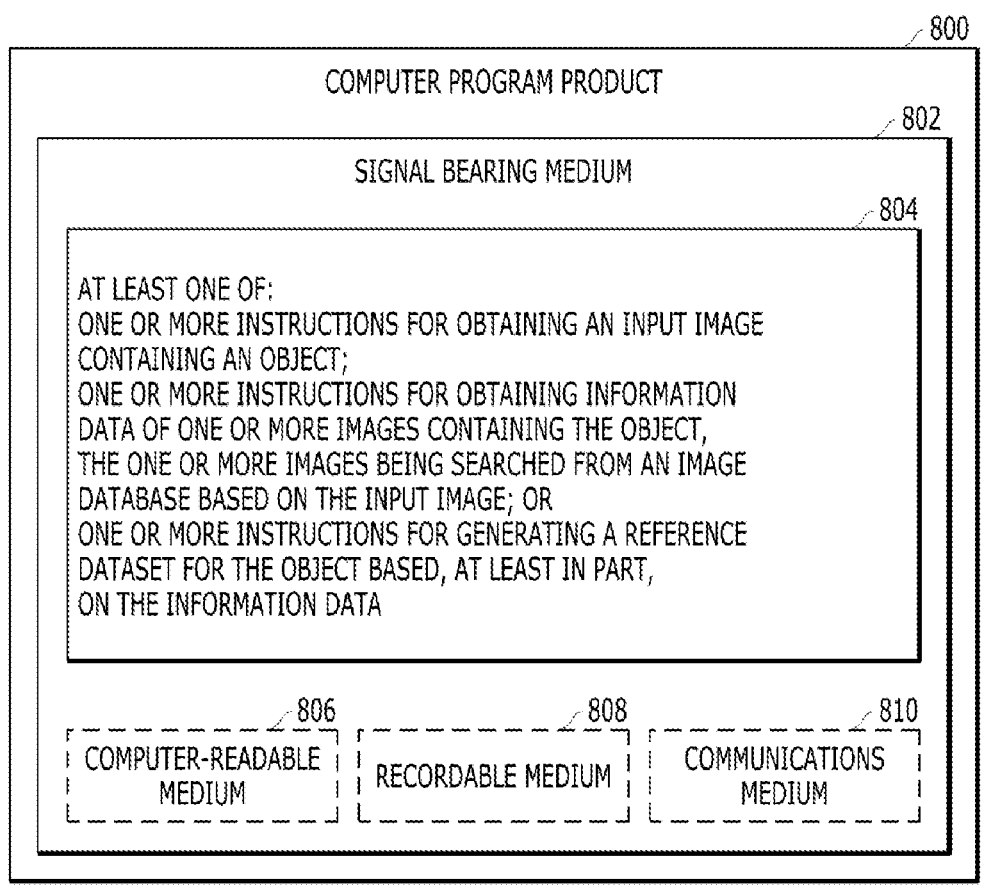
FIG. 8 illustrates a computer program product that may be utilized to perform input assistance, arranged in accordance with at least some embodiments described herein.

FIG. 8 illustrates a computer program product 800 that can be utilized to provide input assistance, in accordance with at least some embodiments described herein. Computer program product 800 may include a signal bearing medium 802. Signal bearing medium 802 may include one or more instructions 804 that, in response to execution by, for example, one or more processors may provide the functionality and features described above with respect to FIGS. 1-7. By way of example, instructions 804 may include at least one of: one or more instructions for obtaining an input image containing an object; one or more instructions for obtaining information data of one or more images containing the object, the one or more images being searched from an image database based on the input image; or one or more instructions for generating a reference dataset for the object based, at least in part, on the information data wherein the reference dataset includes at least some of the information data. Thus, for example, referring to FIGS. 1-3, user device 110 or 200 and/or server 130 or 300 may undertake one or more of the blocks shown in FIGS. 4 and 5 in response to instructions 804.

In some implementations, signal bearing medium 802 may encompass a non-transitory computer-readable medium 806, such as, but not limited to, a hard disk drive, a Compact Disc (CD), a Digital Video Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, program product 800 may be conveyed to one or more modules of a user device, such as for example, user device 110 or 200 by an RF signal bearing medium 802, where the signal bearing medium 802 is conveyed by a wireless communications medium 810 (e.g., a wireless communications medium conforming with the IEEE 802.11 standard).

Figure 9:
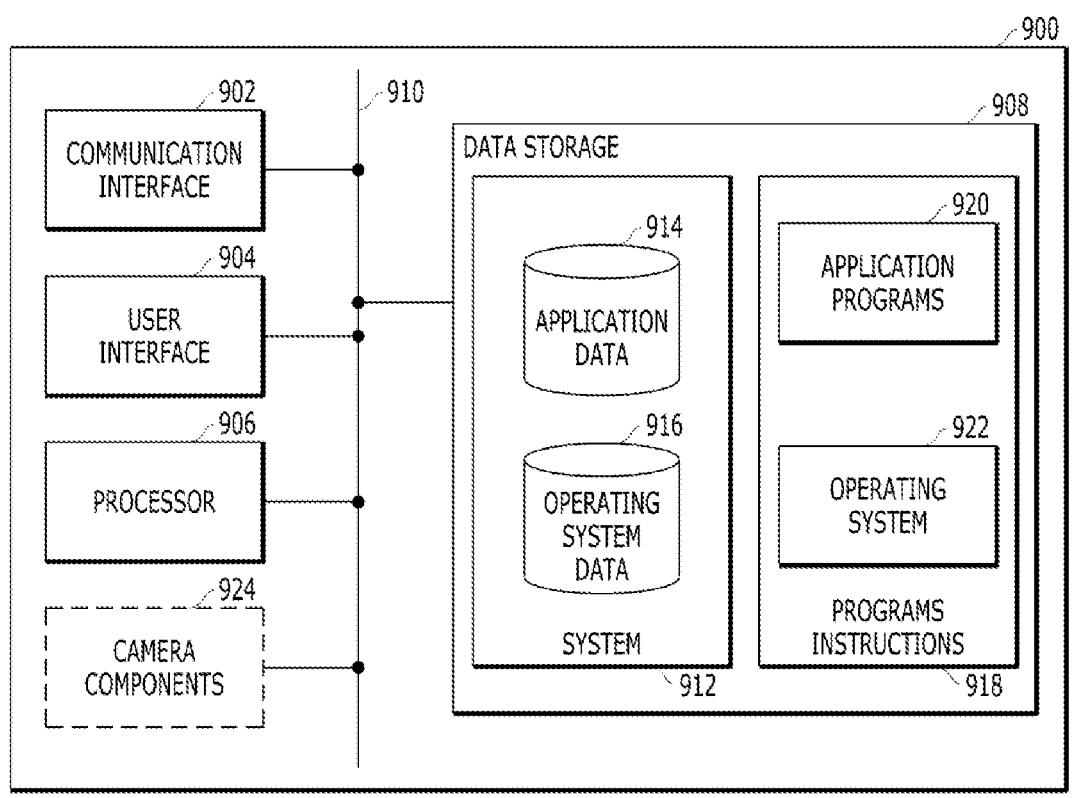
FIG. 9 shows a simplified block diagram of an example computing device that can be configured for input assistance, arranged in accordance with at least some embodiments described herein.

FIG. 9 shows a simplified block diagram of an example computing device that can be configured to provide input assistance. Computational functions (e.g., functions to receive a paint operation and to preprocess region data based on the paint operation) described herein may be performed by a computing system. Such a computing system may be integrated into or take the form of a computing device, such as a mobile phone, a tablet computer, a laptop computer, a server, a cloud computing network, and/or a programmable logic controller. For purposes of example, FIG. 9 is a simplified block diagram showing some of the components of an example computing device 900. Additionally, the example computing device 900 may include camera components 924. Camera components 924 may be controlled at least in part by software executed by processor 906 (by application programs 920). Camera components 924 may include multiple cameras, such as visible light cameras, or other types of cameras.

By way of example and without limitation, computing device 900 may be a cellular mobile telephone (e.g., a smartphone), a computer (such as a desktop, notebook, tablet, or handheld computer), a personal digital assistant (PDA), a home automation component, a digital television, a remote control, a wearable computing device, a robot, a drone, an autonomous vehicle, or some other type of device that may be equipped with an image display and/or user input receiving capabilities.

As shown in FIG. 9, computing device 900 may include a communication interface 902, a user interface 904, a processor 906, a data storage 908, and camera components 924, all of which may be communicatively linked together by a system bus, a network, or other connection mechanism 910.

Communication interface 902 may function to allow computing device 900 to communicate, using analog or digital modulation of electric, magnetic, electromagnetic, optical, or other signals, with other devices, access networks, and/or transport networks. Thus, communication interface 902 may facilitate circuit-switched and/or packet-switched communication, such as plain old telephone service (POTS) communication and/or Internet protocol (IP) or other packetized communication. For instance, communication interface 902 may include a chipset and antenna arranged for wireless communication with a radio access network or an access point. Also, communication interface 902 may take the form of or include a wireline interface, such as an Ethernet, Universal Serial Bus (USB), or High-Definition Multimedia Interface (HDMI) port. Communication interface 902 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 902. Furthermore, communication interface 902 may comprise multiple physical communication interfaces (e.g., a Wi-Fi interface, a BLUETOOTH® interface, and a wide-area wireless interface).

In some embodiments, communication interface 902 may function to allow computing device 900 to communicate, with other devices, remote servers, access networks, and/or transport networks. For example, the communication interface 902 may function to access input image and/or access an image database via communication with a remote server or other remote device or system in order to allow the computing device 900 to obtain an input image containing an object, conduct a search of an image database based on the input image to search for one or more images containing the object, obtain information data of the one or more searched images from the image database and/or generate a reference dataset for the object based on the information data. Additionally, computing device 900 could include cameras, or other image capture devices, configured to capture an image as the input image.

User interface 904 may function to allow computing device 900 to interact with a user, for example to receive input from and/or to provide output to the user. Thus, user interface 904 may include input components such as a keypad, keyboard, touch-sensitive or presence-sensitive panel, computer mouse, trackball, joystick, and so on. User interface 904 may also include one or more output components such as a display screen which, for example, may be combined with a presence-sensitive panel. The display screen may be based on CRT, LCD, and/or LED technologies, or other technologies now known or later developed.

In some embodiments, user interface 904 may include a display screen that display the input image and user painted region on the input image. Additionally, user interface 904 may include one or more buttons, switches, knobs, and/or dials that facilitate the configuration of the display. It may be possible that some or all of these buttons, switches, knobs, and/or dials are implemented as functions on a touch- or presence-sensitive panel.

Processor 906 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other applications or functions. Data storage 908 may include one or more volatile and/or non-volatile storage components, such as magnetic, optical, flash, or organic storage, and may be integrated in whole or in part with processor 906. Data storage 908 may include removable and/or non-removable components.

Processor 906 may be capable of executing program instructions 918 (e.g., compiled or non-compiled program logic and/or machine code) stored in data storage 908 to carry out the various functions described herein. Therefore, data storage 908 may include a non-transitory computer-readable medium, having stored thereon program instructions that, upon execution by computing device 900, cause computing device 900 to carry out any of the methods, processes, or functions disclosed in this specification and/or the accompanying drawings. The execution of program instructions 918 by processor 906 may result in processor 906 using data 912.

By way of example, program instructions 918 may include an operating system 922 (e.g., an operating system kernel, device driver(s), and/or other modules) and one or more application programs 920 (e.g., camera functions, address book, email, web browsing, ecommerce functions, social networking, and/or gaming applications) installed on computing device 900. Similarly, data 912 may include operating system data 916 and application data 914. Operating system data 916 may be accessible primarily to operating system 922, and application data 914 may be accessible primarily to one or more of application programs 920. Application data 914 may be arranged in a file system that is visible to or hidden from a user of computing device 900.

Application programs 920 may communicate with operating system 922 through one or more application programming interfaces (APIs). These APIs may facilitate, for instance, application programs 920 reading and/or writing application data 914, transmitting or receiving information via communication interface 902, receiving and/or displaying information on user interface 904, and so on.

The obtaining of the input image, the conducting of the search of the image database, the obtaining of the information data and/or the generating of the reference dataset could be performed by one or more components of processor 906 (e.g., by one or more digital signal processors (DSPs), graphics processing units (GPUs), central processing units (CPUs), floating point units (FPUs), application-specific integrated circuits (ASICs), some other type of computational component, and/or some combination of one or more types of computational components, of processor 906). For example, certain operations related to the receiving of the operation could be performed by a first computational element or type of computational element (e.g., DSPs, GPUs) of the processor 906 and other certain operations related to the preprocessing could be performed by a second computational element or type of computational element (e.g., a general-purpose CPU) of the processor 906.

Application programs 920 may take the form of "apps" that could be downloadable to computing device 900 through one or more online application stores or application markets (via, e.g., the communication interface 902). However, application programs can also be installed on computing device 900 in other ways, such as via a web browser or through a physical interface (e.g., a USB port) of the computing device 900.

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, reagents, compounds, compositions or biological systems, which can, of course, vary. The terminology used herein is for the purpose of describing particular embodiments only and is not intended to be limiting.

The herein described subject matter sometimes illustrates different components contained within, or connected with, different other components. Such depicted architectures are merely examples, and in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

What is claimed is:

1. A method performed at a computing device that includes one or more processors and memory, the method comprising:
   receiving, from an electronic device, an input image containing an object;
   in response to receiving the input image:
      extracting, from the input image, feature data relating to the object, the feature data including one or more feature vectors;
      performing a search of an image database using the extracted feature data to identify a result set of images containing respective items similar to the object, wherein each image in the image database contains an item with corresponding item information, and wherein performing the search comprises:
         for each image of a plurality of images stored in the image database:
            calculating a respective difference between the one or more feature vectors in the feature data relating to the object and one or more feature vectors corresponding to the item contained in the image; and
            in accordance with a determination that the calculated difference is within a predetermined value, adding the image to the result set of images;
      in accordance with the identification of the result set of images, obtaining item information corresponding to the respective items contained within the result set of images;
      generating filtered item information by filtering the obtained item information based on a predetermined list;
      generating a reference dataset for the object using the filtered item information;
      populating a plurality of fields of a specification for the object using the reference dataset, including suggesting text with a highest probability for a particular field of the plurality of fields; and
      transmitting the reference dataset to the electronic device.

2. The method of claim 1, wherein the item information for each respective item includes at least one of a title, a detailed description, a category and a brand relating to the item.

3. The method of claim 1, wherein generating the reference dataset includes constructing at least one tree data structure using the filtered item information.

4. The method of claim 1, wherein the reference dataset includes at least one title data for suggesting a title of the object and at least one detailed description data for suggesting a detailed description of the object.

5. The method of claim 1, further comprising:
   providing a suggested text relating to the object using the reference dataset.

6. The method of claim 1, further comprising:
   receiving, from the electronic device, a partial user input relating to the object; and
   providing a plurality of candidate completions of the user input using the reference dataset.

7. The method of claim 1, further comprising, in accordance with the identification of the result set of images, obtaining item identifiers for the respective items contained within the result set of images from the image database; and wherein the item information corresponding to the respective items contained within the result set of images is obtained from an item database using the obtained item identifiers.

8. The method of claim 1, further comprising:
   causing a specification to be presented to a user of the electronic device.

9. A computing device, comprising:
   at least one processor; and
   at least one memory storing instructions that, when executed by the at least one processor, cause the at least one processor to perform operations comprising:
   receiving, from an electronic device, an input image containing an object;
   in response to receiving the input image:
      extracting, from the input image, feature data relating to the object, the feature data including one or more feature vectors;
      performing a search of an image database using the extracted feature data to identify a result set of images containing respective items similar to the object, wherein each image in the image database contains an item with corresponding item information, and wherein performing the search comprises:
         for each image of a plurality of images stored in the image database:
            calculating a respective difference between the one or more feature vectors in the feature data relating to the object and one or more feature vectors corresponding to the item contained in the image; and
            in accordance with a determination that the calculated difference is within a predetermined value, adding the image to the result set of images;
      in accordance with the identification of the result set of images, obtaining item information corresponding to the respective items contained within the result set of images;
      generating filtered item information by filtering the obtained item information based on a predetermined list;
      generating a reference dataset for the object using the filtered item information;
      populating a plurality of fields of a specification for the object using the reference dataset, including suggesting text with a highest probability for a particular field of the plurality of fields; and
      transmitting the reference dataset to the electronic device.

10. The computing device of claim 9, wherein the item information for each respective item includes at least one of a title, a detailed description, a category and a brand relating to the item.

11. The computing device of claim 9, wherein the generating the reference dataset includes constructing at least one tree data structure using the filtered information data.

12. The computing device of claim 9, wherein the reference dataset includes at least one title data for suggesting a title of the object and at least one detailed description data for suggesting a detailed description of the object.

13. The computing device of claim 9, wherein the operations further comprise:
   providing a suggested text relating to the object using the reference dataset.

14. The computing device of claim 9, wherein the operations further comprise:

receiving, from the electronic device, a partial user input relating to the object; and providing a plurality of candidate completions of the user input using the reference dataset.

15. A non-transitory computer-readable storage medium having stored therein instructions executable by a computing device to cause the computing device to perform operations comprising:

receiving, from an electronic device, an input image containing an object;

in response to receiving the input image:

extracting, from the input image, feature data relating to the object, the feature data including one or more feature vectors;

performing a search of an image database using the extracted feature data to identify a result set of images containing respective items similar to the object, wherein each image in the image database contains an item with corresponding item information, and wherein performing the search comprises:

for each image of a plurality of images stored in the image database:

calculating a respective difference between the one or more feature vectors in the feature data relating to the object and one or more feature vectors corresponding to the item contained in the image; and in accordance with a determination that the calculated difference is within a predetermined value, adding the image to the result set of images;

in accordance with the identification of the result set of images, obtaining item information corresponding to the respective items contained within the result set of images;

generating filtered item information by filtering the obtained item information based on a predetermined list;

generating a reference dataset for the object using the filtered item information;

populating a plurality of fields of a specification for the object using the reference dataset, including suggesting text with a highest probability for a particular field of the plurality of fields; and transmitting the reference dataset to the electronic device.

16. The non-transitory computer-readable storage medium of claim 15, wherein generating the reference dataset includes constructing at least one tree data structure using the filtered item information.

17. The non-transitory computer-readable storage medium of claim 15, wherein the reference dataset includes at least one title data for suggesting a title of the object and at least one detailed description data for suggesting a detailed description of the object.

18. The non-transitory computer-readable storage medium of claim 15, wherein the operations further comprise:

providing a suggested text relating to the object using the reference dataset.

19. The non-transitory computer-readable storage medium of claim 15, wherein the operations further comprise:

receiving, from the electronic device, a partial user input relating to the object; and providing a plurality of candidate completions of the user input using the reference dataset.

* * * * *